(12) United States Patent
Chen et al.

(10) Patent No.: US 8,240,692 B2
(45) Date of Patent: Aug. 14, 2012

(54) WHEEL-LOCKING SUSPENSION FORK ASSEMBLY FOR A BICYCLE

(76) Inventors: Tien-Li Chen, Tainan (TW); Sen-Chun Tsai, Tainan (TW)

( * ) Notice: Subject to any disclaimer, the term of this patent is extended or adjusted under 35 U.S.C. 154(b) by 0 days.

(21) Appl. No.: 13/239,600

(22) Filed: Sep. 22, 2011

(65) Prior Publication Data
US 2012/0080865 A1    Apr. 5, 2012

(30) Foreign Application Priority Data
Sep. 30, 2010   (TW) .............................. 99133285 A

(51) Int. Cl.
*B62K 19/00*    (2006.01)
(52) U.S. Cl. .......................... 280/276; 70/227
(58) Field of Classification Search .................. 280/276, 280/288.4; 70/227, 225, 226, 233
See application file for complete search history.

(56) References Cited

U.S. PATENT DOCUMENTS

| | | | | |
|---|---|---|---|---|
| 1,402,725 A * | 1/1922 | Pippen | ............................ | 70/227 |
| 1,687,697 A * | 10/1928 | Soulliere | ......................... | 70/227 |
| 3,988,910 A | 11/1976 | Widen | | |
| 4,180,998 A * | 1/1980 | Hellman | ......................... | 70/227 |
| 4,459,833 A * | 7/1984 | Waterkamp et al. | ............ | 70/227 |
| 5,069,049 A * | 12/1991 | Shieh | ............................... | 70/227 |
| 7,631,525 B1 * | 12/2009 | Kennealy | ........................ | 70/227 |

\* cited by examiner

*Primary Examiner* — Tashiana Adams
(74) *Attorney, Agent, or Firm* — Birch, Stewart, Kolasch & Birch, LLP

(57) ABSTRACT

A wheel-locking suspension fork assembly for a bicycle includes first and second cylinder members coupled by a crosspiece disposed above a wheel, and a coupling joint turnably mounted on the first cylinder member and connected to a latch rod that is moved to be retained to a first catch unit on the first cylinder member so as to permit the wheel to freely rotate, or to a second catch unit on the second cylinder member so as to position between spokes of the wheel to lock the wheel. A key-operated lock is disposed in the coupling joint to be displaceable to a locking position where the latch rod is retained in the second catch unit.

5 Claims, 6 Drawing Sheets

WHEEL-LOCKING SUSPENSION FORK ASSEMBLY FOR A BICYCLE

CROSS-REFERENCE TO RELATED APPLICATION

This application claims priority of Taiwanese Patent Application No. 099133285, filed on Sep. 30, 2010, the disclosure of which is herein incorporated by reference.

BACKGROUND OF THE INVENTION

1. Field of the Invention

This invention relates to a suspension fork assembly for a bicycle, more particularly to a wheel-locking suspension fork assembly for a bicycle adapted to be mounted to a wheel axle of a wheel, such as a front wheel.

2. Description of the Related Art

A conventional suspension fork assembly is widely used in a bicycle front fork in recent years. The suspension fork assembly is generally mounted between a head tube and a wheel axle, and includes a fork column, a fork shoulder unit having a center to which the fork column is mounted and a pair of arms which extend downward, and two suspension assemblies each having a rod which is secured to an end of the respective arm, and a cylinder accommodating the rod. A dampening mechanism is disposed between the rod and the corresponding cylinder such that the rod is axially movable relative to the cylinder.

Moreover, a conventional bicycle lock is advantageously formed as an integral part of a bicycle frame so as to be more difficult to pick. Referring to FIG. 1, a conventional locking device 1 as disclosed in U.S. Pat. No. 3,988,910 is shown to include a housing 11 and a pin receiving sleeve 13 respectively mounted on two fork prongs 101 of a bicycle 10, a lock lever 12 pivotably mounted on the housing 11 to be movable between a release position in which a wheel 102 is free to rotate, and a locked position in which the lock lever 12 is in line with the pin receiving sleeve 13, and a locking pin 121 mounted within the lock lever 12 and operable to move by a lock member 122 such that the lock lever 12 is retained in the locked position. However, the housing 11 and the pin receiving sleeve 13 are mounted on the fork prongs 101 by welding or the like and are therefore noticeably exposed on the outside, which renders the outer appearance of the bicycle frame complicated.

SUMMARY OF THE INVENTION

An object of the present invention is to provide a wheel-locking suspension fork assembly for a bicycle which has a simple construction.

According to this invention, the wheel-locking suspension fork assembly includes first and second cylinder members spaced apart from each other in an axial direction of a wheel axle, and each elongated downwardly to terminate at a front claw that is adapted to be mounted on the wheel axle, a crosspiece extending to bridge upper ends of the first and second cylinder members, and disposed above a wheel that is mounted on the wheel axle, a coupling joint disposed on the first cylinder member adjacent to the upper end, having a tubular chamber which extends therethrough along a locking axis and which has lock-receiving and rod-receiving subchambers, and turnable between a first position, where the locking axis is in an upright direction, and a second position, where the locking axis is oriented in the axial direction, a latch rod disposed in and extending outwardly of the rod-receiving subchamber to terminate at a tubular end, a spring-loaded retaining member disposed in the tubular end to be urged by a biasing action of a spring outwardly of the tubular end toward a retaining state, a first catch unit disposed on the first cylinder member, and having a first concavity which is configured such that, when the coupling joint is swept to the first position, the spring-loaded retaining member is urged to slip into and retained in the first concavity, a second catch unit disposed on the second cylinder member, and having a second concavity which is configured such that, when the coupling joint is swept to the second position, the spring-loaded retaining member is urged to slip into and retained in the second concavity, thereby positioning the latch rod between spokes to lock the wheel, and a key-operated lock disposed in the lock-receiving subchamber, and displaceable from a locking position, where the tubular end of the latch rod is retained in the second concavity so as to lock the coupling joint at the second position, and an unlocking position, where the coupling joint is permitted to turn between the first and second positions.

By virtue of the turnable coupling joint mounted on the first cylinder member, the latch rod is movable to permit the spring-loaded retaining member to retain one of the first and second concavities so as to easily unlock or lock the wheel. Moreover, the joint mount and the first and second latch units may be integrally molded on the first and second cylinder members and may be made compact, thereby not affecting the outer appearance of the bicycle.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
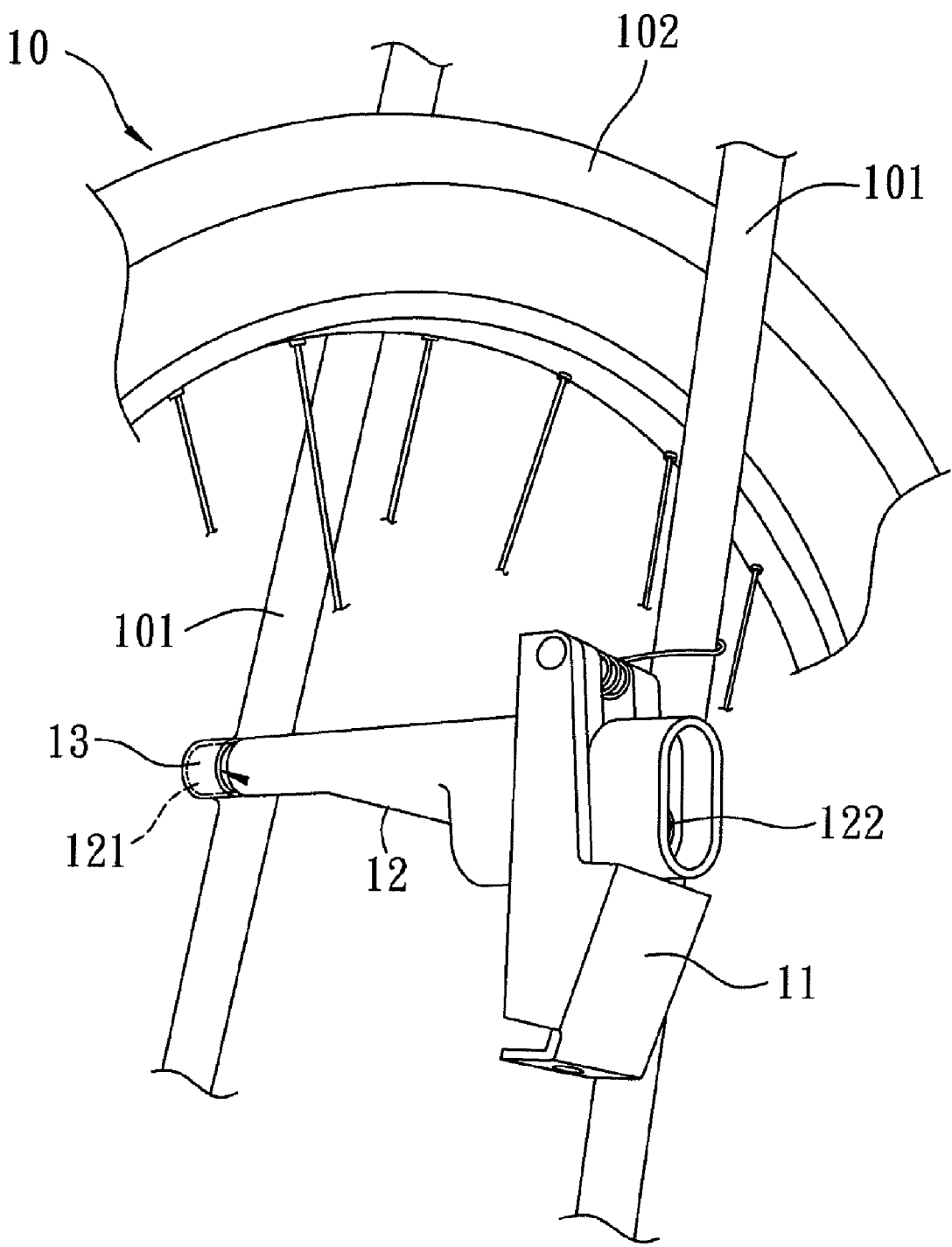
FIG. 1 is a perspective view of a conventional locking device disclosed in U.S. Pat. No. 3,988,910.
Figure 2:
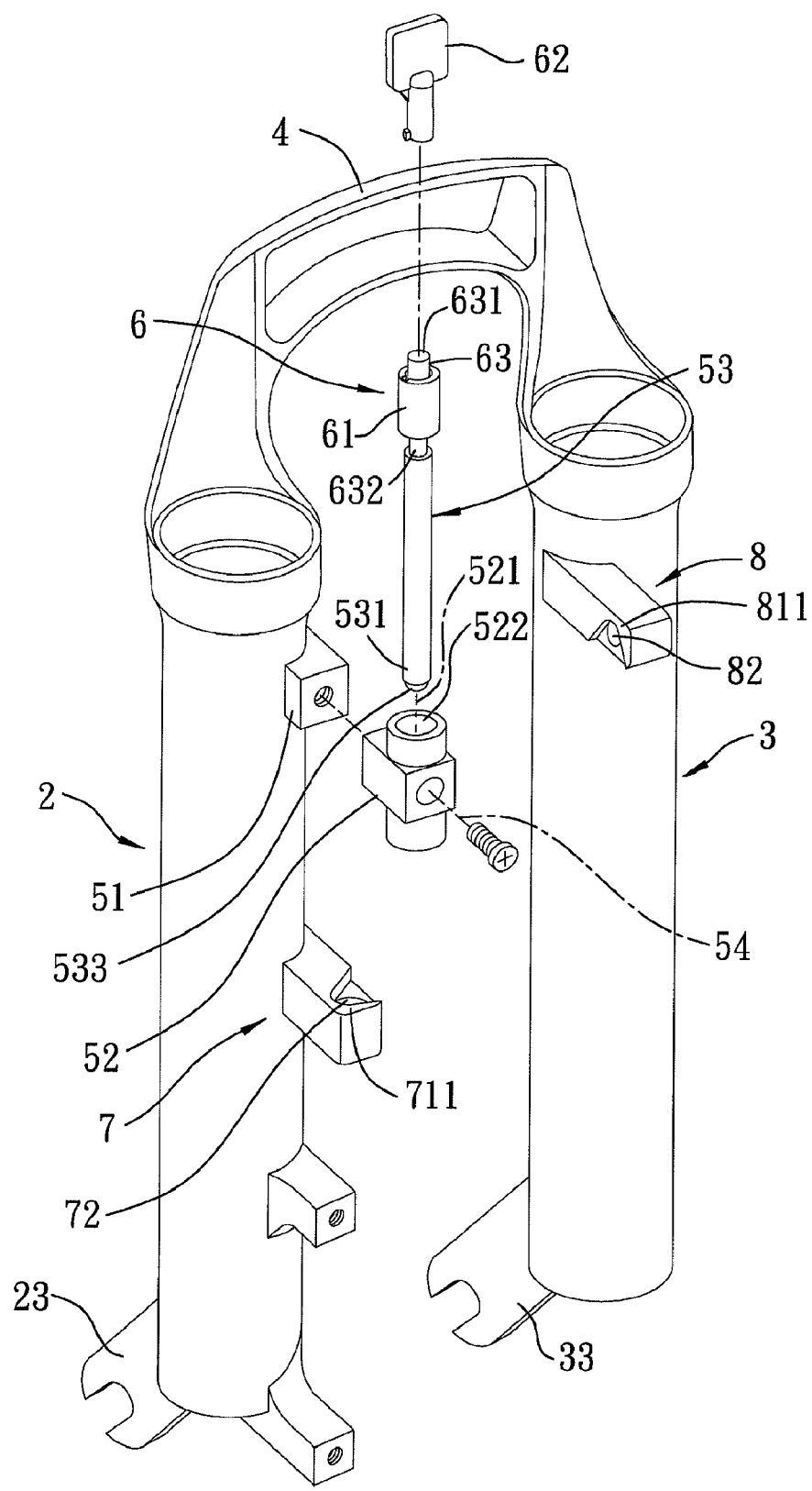
FIG. 2 is an exploded perspective view of the embodiment of a wheel-locking suspension fork assembly according to this invention.
Figure 3:
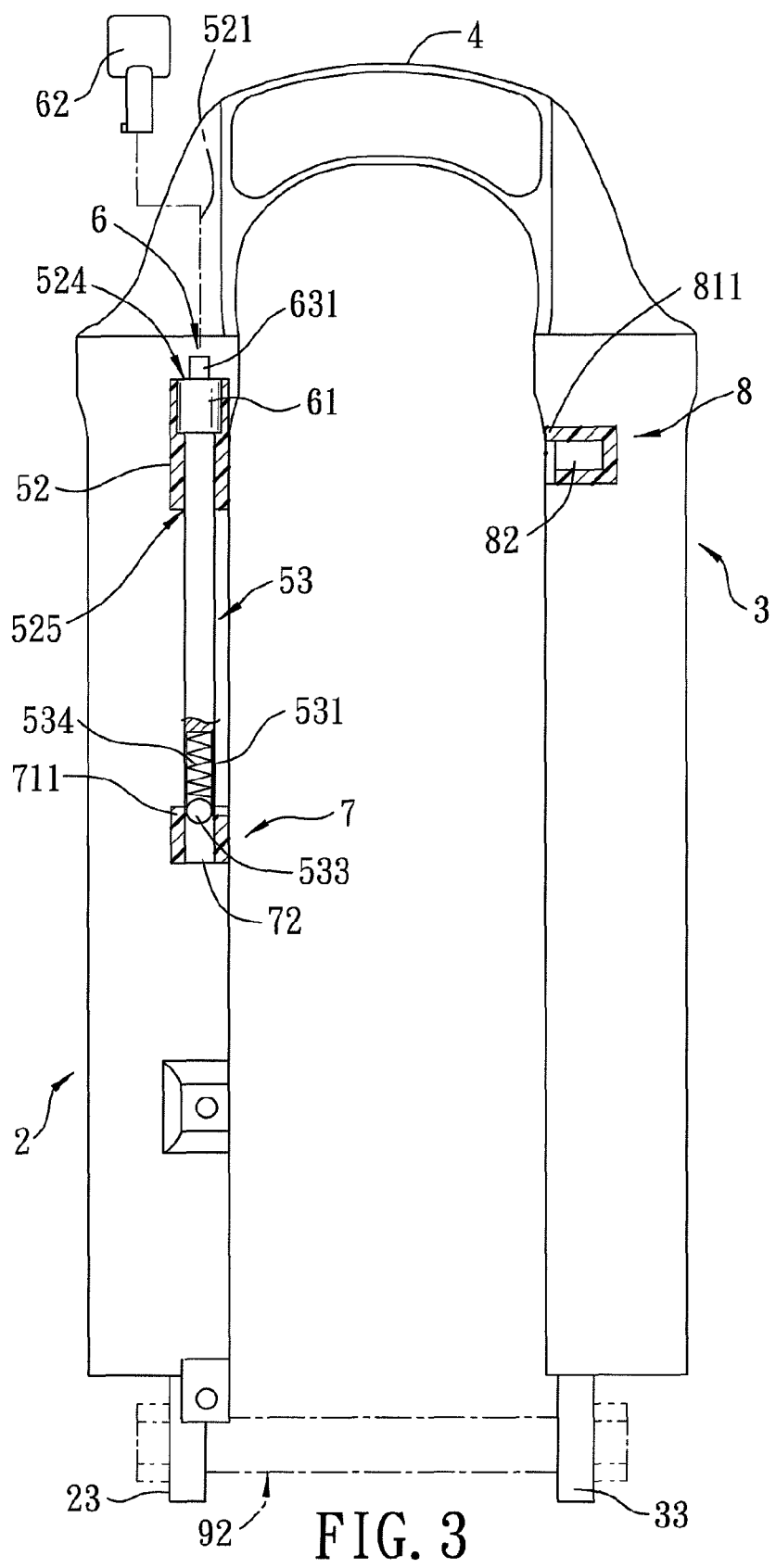
FIG. 3 is a partly sectioned schematic view of the embodiment when a coupling joint in a first position.
Figure 6:
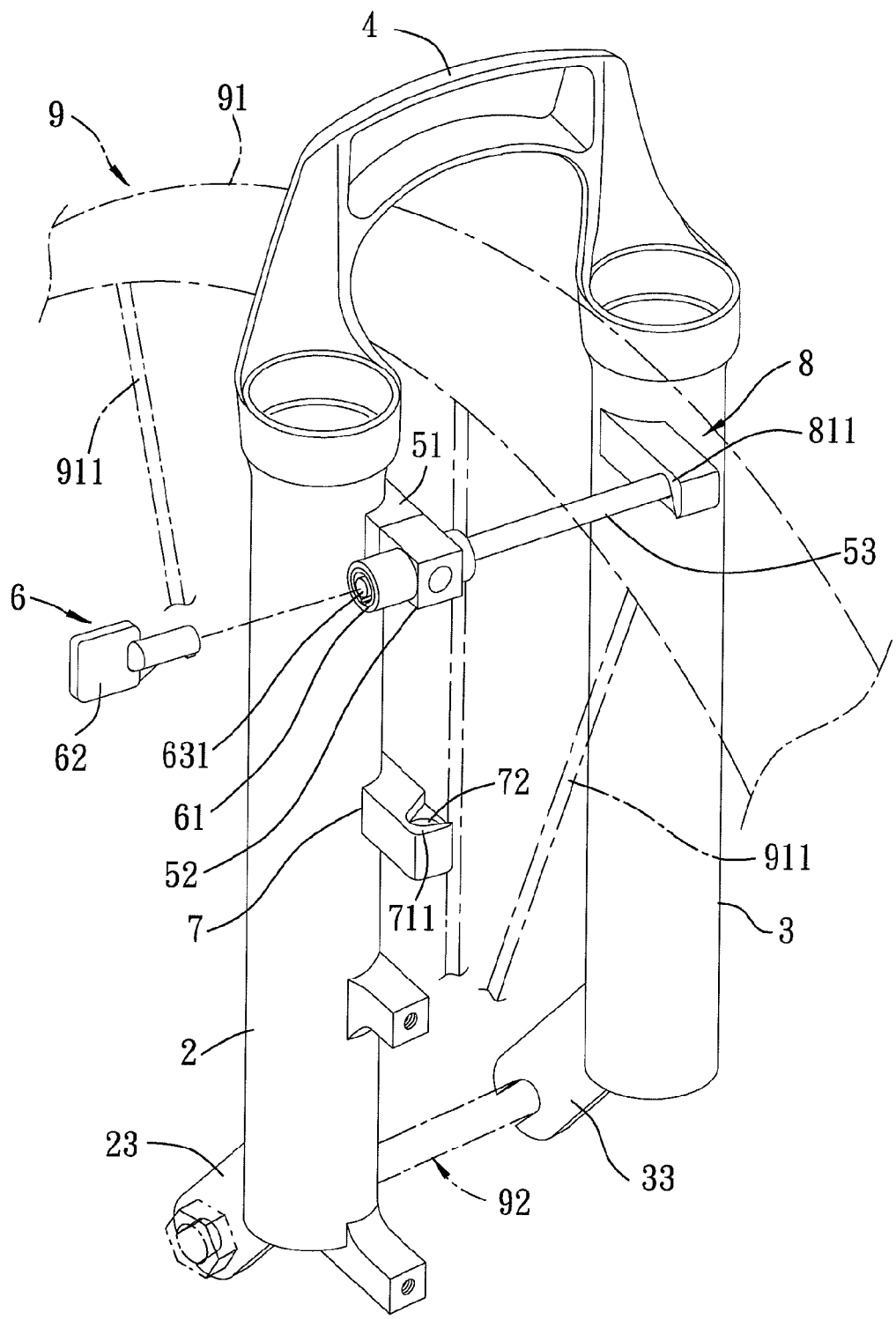
FIG. 6 is perspective view showing the embodiment mounted on a bicycle.

Referring to FIGS. 2, 3 and 6, the embodiment of a wheel-locking suspension fork assembly for a bicycle 9 according to the present invention is shown to comprise first and second cylinder members 2, 3 spaced apart from each other in an axial direction of a wheel axle 92 of a bicycle wheel 91, such as a front wheel 91, and each elongated downwardly to terminate at a front claw 23, 33 that is adapted to be mounted on the wheel axle 92, and a crosspiece 4 extending to bridge upper ends of the first and second cylinder members 2, 3, and disposed above the wheel 91 that is mounted on the wheel axle 92. The first and second cylinder members 2, 3 may be disposed to accommodate a pair of rods (not shown) so as to permit axial movement of the rods, and cooperate with a dampening mechanism (not shown) to form as a bicycle suspension system.

The wheel-locking suspension fork assembly of this embodiment further comprises a coupling joint 52, a latch rod 53, a spring-loaded retaining member 533, a first catch unit 7, a second catch unit 8, and a key-operated lock 6.

Figure 4:
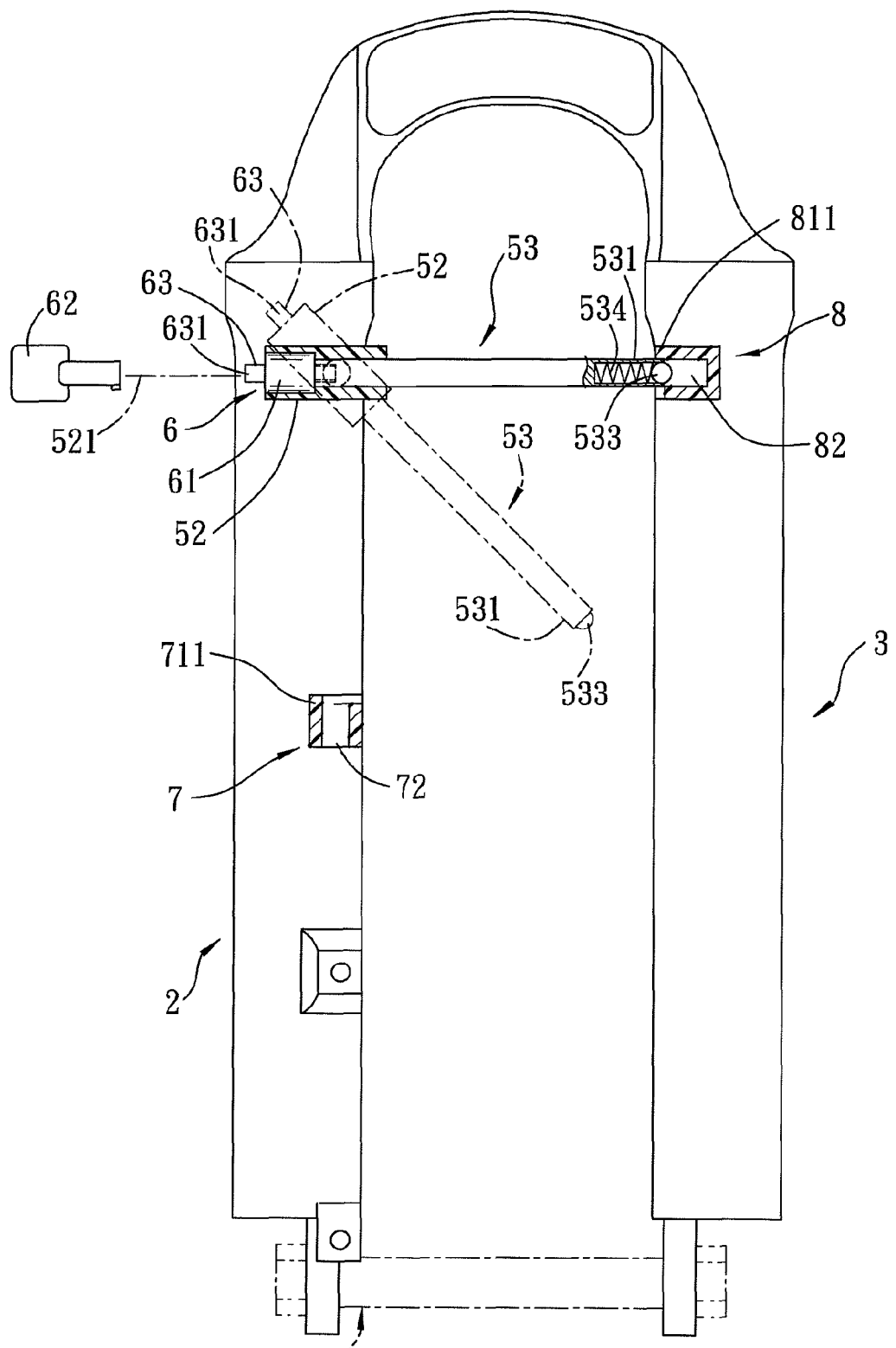
FIG. 4 is a partly sectioned schematic view of the embodiment when the coupling joint turned from the first position to a second position.

The coupling joint 52 is pivotably mounted on a joint mount 51 which is integrally formed on the first cylinder member 2 and adjacent to the upper end, and has a tubular chamber 522 which extends therethrough along a locking axis 521 and which has lock-receiving and rod-receiving subchambers 524, 525. The coupling joint 52 is turnable about a joint axis 54 that is transverse to the locking axis 521 between a first position, as shown in FIG. 3, where the locking axis 521 is in an upright direction, and a second position, as shown in FIG. 4, where the locking axis 521 is oriented in the axial direction of the wheel axle 92.

The latch rod 53 is disposed in and extends outwardly of the rod-receiving subchamber 525 to terminate at a tubular end 531. The spring-loaded retaining member 533 is disposed in the tubular end 531 to be urged by a biasing action of a spring 534 outwardly of the tubular end 531 toward a retaining state. In this embodiment, the retaining member 533 is in the form of a ball 533.

The first catch unit 7 is integrally formed on the first cylinder member 2 distal from the upper end, and has a first concavity 72 which is configured such that, when the coupling joint 52 is swept to the first position, the spring-loaded retaining member 533 is urged to slip into and retained in the first concavity 72. The first catch unit 7 further has a barrier wall 711 which is disposed to restrain the extent of displacement of the latch rod 53 so as to ensure retaining of the spring-loaded retaining member 533 within the first concavity 72 when the coupling joint 52 is turned to the first position.

The second catch unit 8 is integrally formed on the second cylinder member 3, and has a second concavity 82 which is configured such that, when the coupling joint 52 is swept to the second position, the spring-loaded retaining member 533 is urged to slip into and retained in the second concavity 82, thereby positioning the latch rod 53 between wheel spokes 911 to lock the wheel 91. The second catch unit 8 further has a barrier wall 811 which is disposed to restrain the extent of displacement of the latch rod 53 so as to ensure retaining of the spring-loaded retaining member 533 within the second concavity 82 when the coupling joint 52 is turned to the second position.

Figure 5:
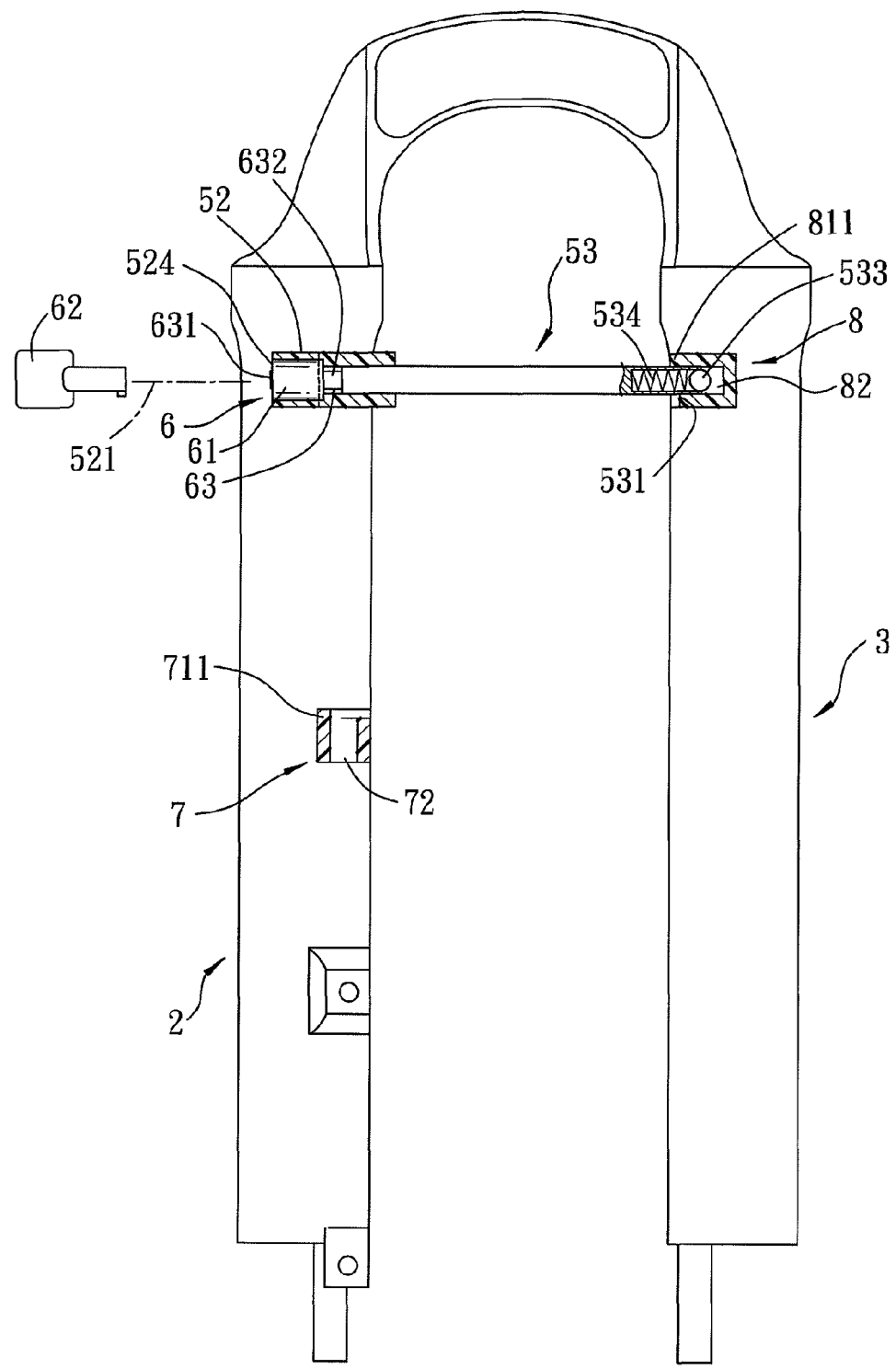
FIG. 5 is a partly sectioned schematic view of the embodiment when a lock in a locking position.

The key-operated lock 6 is disposed in the lock-receiving subchamber 524, and is displaceable from a locking position, as shown in FIG. 5, where the tubular end 531 of the latch rod 53 is retained in the second concavity 82 so as to lock the coupling joint 52 at the second position, and an unlocking position, as shown in FIG. 4, where the coupling joint 52 is permitted to turn between the first and second positions. In this embodiment, the key-operated lock 6 includes a tubular lock 61 disposed in the lock-receiving subchamber 524 and having a plug 63 which has a connected end 632 that is connected to the latch rod 53, and an operated end 631 that extends outwardly from the lock-receiving subchamber 524. Thus, as shown in FIG. 5, when the operated end 631 is pushed manually, a movement of the operated end 631 into the lock-receiving subchamber 524 to displace the key-operated lock 6 toward the locking position brings the latch rod 53 to move the tubular end 531 further into the second concavity 82 so as to lock the coupling joint 52 at the second position. Further, when the plug 63 is operated by a key 62, such as a tubular key 62, to displace the key-operated lock 6 to the unlocking position, the tubular end 531 becomes disengageable from the second concavity 82 so as to permit turning of the coupling joint 52.

According to this embodiment, by virtue of the turnable coupling joint 52 mounted on the first cylinder member 2, the latch rod 53 is movable to permit the spring-loaded retaining member 533 to retain one of the first and second concavities 72, 82 so as to facilitate performing an unlock/lock action of the wheel 91. Moreover, the joint mount 51 and the first and second latch units 7, 8 are integrally molded on the first and second cylinder members 2, 3, and can be made compact, thereby not affecting the outer appearance of the bicycle 9.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A wheel-locking suspension fork assembly for a bicycle which has a wheel axle extending in an axial direction, comprising:

first and second cylinder members spaced apart from each other in the axial direction, and each elongated downwardly to terminate at a front claw that is adapted to be mounted on the wheel axle;

a crosspiece extending to bridge upper ends of said first and second cylinder members, and disposed above a wheel that is mounted on the wheel axle;

a coupling joint disposed on said first cylinder member adjacent to said upper end, and having a tubular chamber which extends therethrough along a locking axis and which has lock-receiving and rod-receiving subchambers, said coupling joint being turnable about a joint axis that is transverse to the locking axis between a first position, where the locking axis is in an upright direction, and a second position, where the locking axis is oriented in the axial direction;

a latch rod disposed in and extending outwardly of said rod-receiving subchamber to terminate at a tubular end;

a spring-loaded retaining member disposed in said tubular end to be urged by a biasing action of a spring outwardly of said tubular end toward a retaining state;

a first catch unit disposed on said first cylinder member distal from said upper end, and having a first concavity which is configured such that, when said coupling joint is swept to the first position, said spring-loaded retaining member is urged to slip into and retained in said first concavity in the retaining state;

a second catch unit disposed on said second cylinder member, and having a second concavity which is configured such that, when said coupling joint is swept to the second position, said spring-loaded retaining member is urged to slip into and retained in said second concavity in the retaining state, thereby positioning said latch rod between spokes to lock the wheel; and a key-operated lock which is disposed in said lock-receiving subchamber, and displaceable from a locking position, where said tubular end of said latch rod is retained in said second concavity so as to lock said coupling joint at the second position, and an unlocking position, where said coupling joint is permitted to turn between the first and second positions.

2. The wheel-locking suspension fork assembly as claimed in claim 1, wherein said key-operated lock includes a tubular lock disposed in said lock-receiving subchamber and having a plug, said plug having a connected end which is connected to said latch rod, and an operated end which extends outwardly of said lock-receiving subchamber such that, when said coupling joint is at the second position, a movement of said operated end into said lock-receiving subchamber to displace said key-operated lock toward the locking position brings said latch rod to move said tubular end further into said second concavity so as to lock said coupling joint at the second position, and such that, when said plug is operated by a key to displace said key-operated lock to the unlocking position, said tubular end becomes disengageable from said second concavity so as to permit turning of said coupling joint.

3. The wheel-locking suspension fork assembly as claimed in claim 2, wherein each of said first and second catch units has a barrier wall which is disposed to restrain the extent of displacement of said latch rod so as to ensure retaining of said spring-loaded retaining member within a corresponding one of said first and second concavities when said coupling joint is turned to a corresponding one of the first and second positions.

4. The wheel-locking suspension fork assembly as claimed in claim 1, wherein said spring-loaded retaining member is in form of a ball.

5. The wheel-locking suspension fork assembly as claimed in claim 1, wherein said first cylinder member has a joint mount on which said coupling joint is pivotably mounted, said first and second catch units being integrally formed with said first and second cylinder members, respectively.

\* \* \* \* \*